Patented July 6, 1943

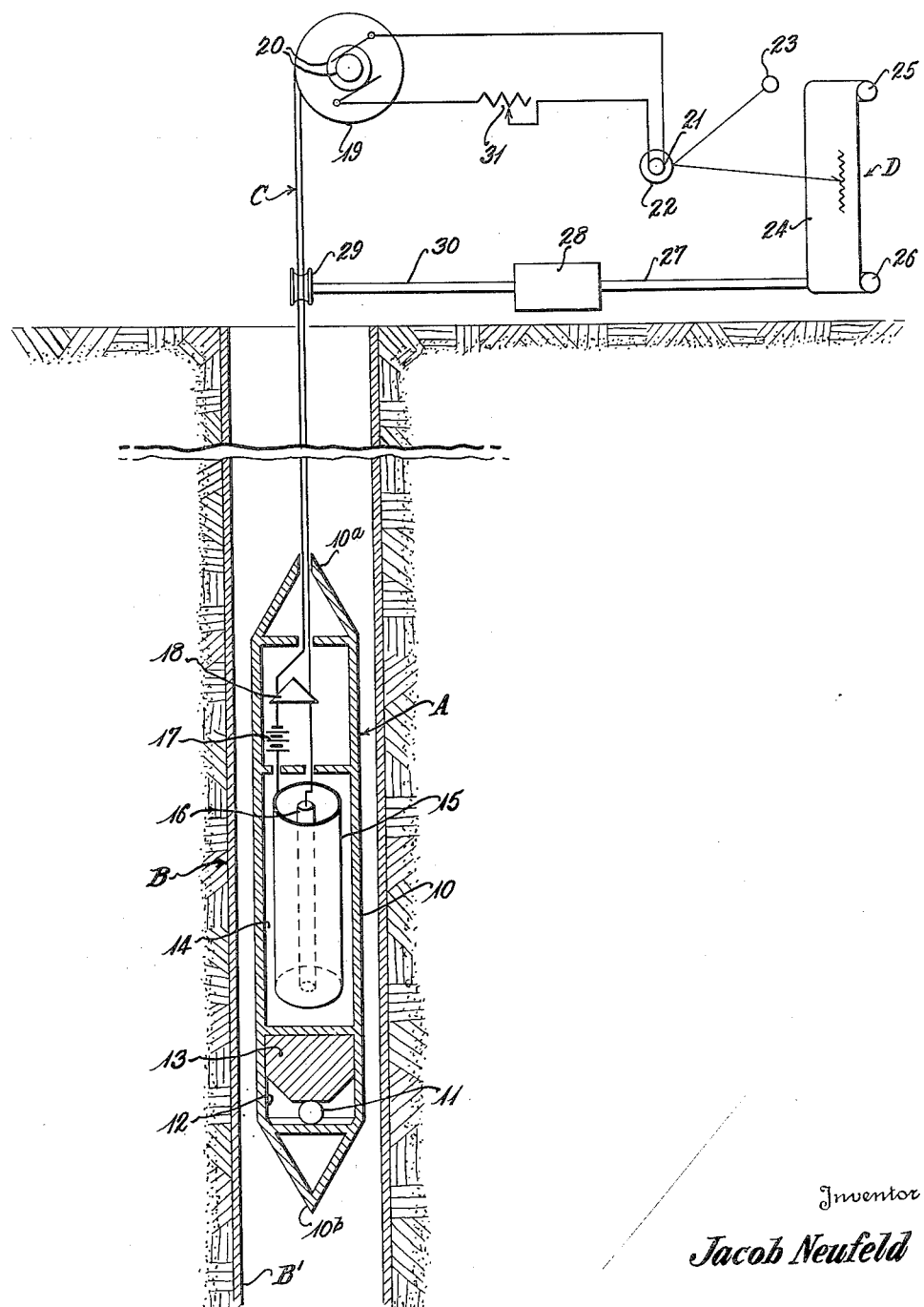

2,323,484

UNITED STATES PATENT OFFICE 2,323,484

WELL-LOGGING METHOD AND APPARATUS

Jacob Neufeld, Tulsa, Okla., assignor to Well Surveys, Incorporated, Tulsa, Okla., a corporation of Delaware Application May 12, 1941, Serial No. 393,127

6 Claims. (Cl. 250—83.6)

This invention relates generally to methods of geophysical prospecting commonly employed in connection with gas and oil wells, and more especially is concerned with improvements in a process of radioactivity well-logging.

Three types of radioactive radiation are known: namely $\alpha$, $\beta$ and $\gamma$ rays. The $\alpha$ and $\beta$ rays are not radiations in the true sense of the word but instead are streams of positively and negatively charged particles respectively, hence they are readily absorbed by massive substances and have but a limited range of travel. For instance, the range in air of $\alpha$ rays, which are streams of helium nuclei, varies from about 2.7 to 8.6 cms. and even rays of highest velocity are completely arrested by .06 mm. of aluminum. The $\beta$ rays, which are streams of electrons, are likewise unable to penetrate solids to any appreciable degree, being fully absorbed within a distance of a few mm. Only the $\gamma$ rays are radiations in the proper sense of the term: they are electromagnetic wave motions comparable to light and X-rays but of shorter wave length and, although they can be deflected by magnetic or electrical fields, their power of penetration is such that they readily pass through several centimeters of lead or similar massive solids.

As will be apparent from the foregoing, $\alpha$ and $\beta$ rays due to their limited range which would cause them to be absorbed by rock, moisture and other substances present in the well bore, most present day methods of radioactivity well-logging are based upon the detection of $\gamma$ rays as it has been found that this form of radiation not only readily penetrates rock formations, mud and other kindred materials but also passes with ease through steel or iron, thus permitting logging of the well subsequent to casing, if desired. This last mentioned factor is of considerable practical importance because it permits the logging of wells in old producing fields which originally were drilled to a depth where a producing sand was known to exist without any attempt to study strata traversed in the operation. In such instances, producing horizons have been often traversed during drilling and sealed by the drilling mud without being recognized. After the deeper sand layer is depleted, these higher horizons now may be located and the well casing perforated at a suitable depth to obtain production therefrom.

Most present day methods of radioactivity well-logging are based upon observations of the natural radiations emanating from sub-surface rock formations, since it has been found that virtually all substances possess measurable though different degrees of radioactivity due to the pressence therein of radium or some other radioactive material. For example, the following table indicates the approximate relative degrees of radioactivity, expressed as radium content, of rocky substances commonly encountered in well-logging operations.

|  | Grams of radium per gram of rock |
|---|---|
| Igneous rocks— | |
| Granite | $4.0 \times 10^{-12}$ |
| Syenite | $3.5 \times 10^{-12}$ |
| Basalt | $0.5 \times 10^{-12}$ |
| Olivine | $0.3 \times 10^{-12}$ |
| Sedimentary rocks— | |
| Representative shale | $1.5 \times 10^{-12}$ |
| Devonian black shale | $10.0 \times 10^{-12}$ |
| Limestone | $1.3 \times 10^{-12}$ |
| Sandstone | $0.9 \times 10^{-12}$ |
| Chert | $0.5 \times 10^{-12}$ |

Those methods of well-logging based upon measurement of the natural radioactivity of traversed strata however, while affording valuable information concerning subsurface formations, do not always provide so complete a study of characteristic subterranean geological structures as to preclude the seeking of additional data, hence it is commonly the practice to use several methods of well-logging when studying each locality of interest in order that more than one parameter may be provided upon which to base conclusions concerning the location of valuable deposits. These supplemental studies can include measurements of subsurface porosity, specific electrical resistance, reluctance to electrical fields, and absorption, reflection, or scattering of high frequency radiations, particularly gamma rays.

While in ordinary radioactivity well-logging wherein merely a detector of natural radioactivity is necessary for practice of the process, when performing studies of absorption, reflection or scattering of gamma rays according to present day practices, it is customary to employ an instrument comprising a radiation detector and a source of radiation. During use, the instrument is moved within the well and the intensity of radiation due to reflection or scattering is measured by the detector and recorded in correlation with depth measurements to provide a record of variations in this quality of subterranean strata traversed by the well as an index of their geological nature. To avoid confusion by the detector, between reflected radiation and natural radiation characteristic of the structures under examination, the radiation source within the instrument is usually selected to provide an intensity of radiation which, even when reflected, is of a wholly different order of magnitude or frequency, or both from the corresponding characteristics of inherent gamma ray radiation of the structure.

As this last described process is now usually practiced, a quantity of naturally radioactive material such as radium and its disintegration products, uranium, thorium and its disintegration products particularly mesothorium II, a mixture of radium and beryllium, or the like is used as a source of radiation. Although these substances are eminently well suited to use for this purpose and provide an adequate proportion of radiation of the desired powers of penetration, their use is attended with the disadvantage that their extreme scarcity and the difficulties of refining them from their ores cause them to be very costly, thus limiting to a degree their employment in this field. Moreover, while use of these expensive substances under laboratory conditions, as for instance in therapy, ordinarily is accompanied by precautions precluding accidental loss or contamination, the conditions of field prospecting work are such that of necessity the same elaborate precautions cannot be employed, hence the likelihood of loss of the material in the latter instance is materially increased. Those circumstances of field use which present the most difficulty in this respect arise from the fact that the substance during use is retained within a capsule which is moved within the well bore being logged and which accordingly is subjected not only to shocks incidental to movement, but is also required to withstand the strains produced by the high hydrostatic pressures encountered. Furthermore, the capsule is subject to loss within the well bore due to breaking of the cable or failure of the linkage between the cable and the capsule. These hazards, together with the high cost of naturally radioactive material, have caused a need to arise for a relatively cheap but efficient and reliable source of extremely high frequency radiation which could replace naturally radioactive materials for this purpose.

The present invention provides an improved process of radioactivity well-logging utilizing a source of radiation which is not only much less expensive than the natural materials but which can provide high frequency radiation of increased penetrating ability, thus enabling the measurement of qualities indicative of the nature of subterranean geological strata at a greater distance from the axis of the drill hole than was heretofore possible.

The present invention is concerned with the discovery that practically all available materials, which in their usual or natural state do not possess radioactivity, can be activated by suitable treatment whereby they yield radiations similar to radiations of natural radioelements. In some instances materials so activated yield gamma rays of considerable penetrating ability, having a power of penetrating massive substances several times that possessed by gamma rays derived from radium C. It also has been found that the radioactivity thus artificially induced remains as a characteristic property of the treated material for a considerable period thereafter, varying from a fraction of a second to many years, differing in degree depending upon the extent of activation and the nature of the material activated.

The activation of normally non-radioactive materials can be accomplished by exposing the material to bombardment by a stream of alpha particles obtained from a suitable source, such as natural radioactive substance. However, the preferred method of activation consists of exposing the material to a beam of helium ions, protons or deuterons accelerated by very high voltages.

Another method of activating substances consists in exposing the material to bombardment by a stream of neutrons, which can be fast neutrons, although preferably a slow stream is used. The latter method of utilizing a stream of slow neutrons for the purpose of producing artificially radioactive substances is described in the U. S. Patent 2,206,634, issued to Fermi et al.

One of the substances which has been found suitable for activation as above mentioned is, for example, sodium, which after bombarded by a stream of deuterons of great energy produces a radioelement that emits a very hard gamma radiation.

For purposes of illustration, an application of the process according to the present invention whereby a normally non-radioactive substance is caused to possess radioactive characteristics will be described. In this instance, a layer of metallic sodium is prepared upon an appropriate supporting surface under conditions whereby oxidation or other purely chemical reactions will be minimized, if not wholly excluded, before the activation process begins. The sodium is then subjected to bombardment by extremely fast streams of deuterons, accelerated if desired for example, in a cyclotron. After being so treated for a period of time depending upon the desired characteristic properties of the radioelement to be so produced, the material is ready for use.

For convenience, the expression "streams of particles of atomic dimensions" will be hereinafter used to designate streams of alpha rays, fast and slow neutrons and hard gamma rays.

The artificially radioactive material prepared as hereinabove described can advantageously be utilized in well-logging operations by employment in conjunction with the type of apparatus disclosed in the copending application of Robert E. Fearon, Serial No. 239,781, filed November 10, 1938.

The accompanying figure of drawing illustrates diagrammatically a presently preferred form of apparatus for practicing the well-logging process forming the subject matter of this invention.

The well-logging apparatus illustrated in the drawing comprises a capsule, generally designated by the reference character A, which is suspended within a well bore B by a cable C, through which mechanism within capsule is electrically connected to suitable analyzing and recording means generally indicated by the reference character D. It is to be observed that, as illustrated, the well bore is provided with a casing B', formed as is customary from steel, iron or the like.

The capsule A comprises a casing or shell 10, of iron, steel or other material adapted to resist wear and the high hydrostatic pressures encountered under conditions of use, and is provided with substantially pointed upper and lower ends 10a and 10b respectively for facilitating movement of the capsule within the well bore. A radiation source 11 is mounted within a chamber 12 located near the bottom end 10b of the capsule 10, and is shielded to prevent travel of radiation from the source directly into upper parts of the capsule by a mass of radiation-absorptive material 13, which can advantageously be a suitably formed lead block. It is to be noted that the lowermost edge of the block 13 is cut away to present an inverted frustum, thus permitting radiation to extend obliquely upwardly, although not within the capsule.

The radiation detecting means in this instance is located in an upper portion of the capsule 10 within a chamber 14 and comprises an ionization chamber wherein are mounted spaced differentially electrically charged electrodes 15 and 16 surrounded by an appropriate dielectric medium. The ionization chamber can be one of the several types suited for this use, such as a Geiger-Müller counter, a high pressure chamber, or the like. The electrodes 15 and 16 are connected in series with a battery 17 and an amplifier 18 in a manner such that radiation impinging upon the ionization chamber causes a detectable increase of current to flow between the electrodes, thereby delivering an impulse or signal to the amplifier.

The amplifier output passes to insulated conductors within the cable C from which in turn the amplified signal is delivered by means including slip rings 20 mounted on the winch drum 19, to the analyzing and recording apparatus D. It is to be understood that if desired the amplifier unit 18 can include auxiliary apparatus such as a derivator for the purpose of providing a sharp and substantially instantaneous change in signal yielding a secondary peak wave advanced in phase from the primary signal wave derived from the electrodes 15 and 16. It is also to be understood that if desired the signal can be transmitted to the analyzing and recording apparatus from the amplifier by modulated radio carrier waves instead of by means of the cable C as illustrated.

The analyzing and recording apparatus D comprises a moving galvanometer coil 21 associated with a mirror 22 which reflects an image of a light source 23 onto a moving light-sensitive film 24 supported on a pair of spools 25 and 26. The galvanometer coil 21 is connected in series through a resistance 31 to the slip rings 20 on the winch drum 19, whereby a signal from the detecting means within the capsule A is amplified and, when transmitted to the galvanometer coil, causes movement of same with resultant alteration in position of the light source image reflected upon the film 24.

The film 24 is moved from one spool to the other at a rate proportional to the rate of motion of the capsule A within the well bore by a power transmission including a shaft 27 and gear box 28 operated by an idler wheel 29, mounted on a shaft 30, which engages with and is rotated by motion of the cable C. It is to be understood of course that if desired other transmission systems for driving the spool 26 can be utilized instead of the gear transmission mentioned, for instance a Selsyn transmission is well suited for this purpose.

It will be evident that after use the developed film will provide a visual record of signals received from the detecting means capsule correlated with a record of motion of the capsule within the well bore.

From the foregoing description of the apparatus according to this invention and its mode of operation, it will be evident that the apparatus provides a log indicative of the reflection, absorption and scattering of radiation emanating from the source 11 and, after passing through the capsule casing 10 and well casing B', entering the ionization chamber 14. Although the specific process of geophysical prospecting described indicated preparation of the artificially radioactive material prior to introduction into the well, it will be understood that the material can be activated in situ within the well bore without departure from this invention.

Having thus described the present invention what is desired to secure by Letters Patent is:

1. Method of geophysical exploration that comprises moving within a well bore a mass of metallic sodium rendered artificially radioactive by bombardment with a stream of fast deuterons; measuring the radiation emanating from the mass reflected by subterranean strata; and correlating the measurements so derived with measurements of depth.

2. Method of producing within a well bore for purposes of geophysical exploration gamma rays characterized by high penetrating power that comprises positioning within the well bore a normally non-radioactive substance rendered radioactive by bombardment with a stream of fast deuterons said substance being metallic sodium.

3. Geophysical prospecting device adapted to being moved within a well bore for detecting characteristics of traversed strata that comprises a radiation source including a mass of sodium metal activated by bombardment with streams of fast deuterons and means for detecting radiation emanating from said source reflected from subterranean strata.

4. Geophysical exploration apparatus that comprises a capsule adapted to being moved within a well bore, a radiation source within the capsule comprising a mass of metallic sodium rendered radioactive by bombardment with streams of fast deuterons, means for detecting and measuring radiation emanating from said source reflected from subterranean strata, and means for recording the measurements so obtained in correlation with measurements of depth.

5. Method of geophysical exploration that comprises moving within a well bore a mass of substance rendered artificially radioactive by bombardment with a stream of fast deuterons, said substance being similar in decay characteristics to activated metallic sodium; measuring the radiation emanating from the mass reflected by the subterranean strata; and correlating the measurements so derived with measurements of depth.

6. Method of geophysical exploration that comprises moving within a well bore a mass of substance rendered artificially radioactive by bombardment with a stream of fast deuterons, said substance being similar in decay characteristics to activated metallic sodium and being capable of producing gamma radiations having energy higher than 2.6 million electron volts per quantum; measuring the radiation emanating from the mass reflected by the subterranean strata; and correlating the measurements so derived with measurements of depth.

JACOB NEUFELD.